March 21, 1961  J. D. HERBERT  2,975,629
TEST EQUIPMENT FOR DETERMINING TEMPERATURE
CHANGE CHARACTERISTICS OF MATERIALS
Filed June 6, 1958  2 Sheets-Sheet 1

JOHN D. HERBERT
INVENTOR.
BY HIS ATTORNEYS
HARRIS, KIECH, FOSTER & HARRIS

JOHN D. HERBERT
INVENTOR.
BY HIS ATTORNEYS
HARRIS, KIECH, FOSTER & HARRIS

United States Patent Office 2,975,629
Patented Mar. 21, 1961

2,975,629

TEST EQUIPMENT FOR DETERMINING TEMPERATURE CHANGE CHARACTERISTICS OF MATERIALS

John D. Herbert, Los Angeles, Calif., assignor, by mesne assignments, to The Patent and Licensing Corporation, New York, N.Y., a corporation of Massachusetts Filed June 6, 1958, Ser. No. 740,460

10 Claims. (Cl. 73—15)

This invention relates to test equipment for determining temperature change characteristics of materials and is particularly suitable for testing the setting characteristics of plasters and cements. It is well known that the hardening or setting characteristics of various mixtures of plasters and cements are different and that these characteristics can be changed by adding accelerators or inhibitors to the mixtures. In developing particular mixtures, it is desirable to be able to test the setting characteristics of a large number of mixtures easily and simply. Also, when a plaster or cement is in use in construction or the like, it is oftentimes desirable to make tests on the setting characteristics using samples taken from the batch in actual use.

Accordingly, it is an object of the invention to provide an apparatus for making accurate, simple and dependable tests on the setting or other temperature change characteristics of plaster, cements, plastics, and various other chemicals and mixtures thereof. A further object is to provide such apparatus for use in making a large number of such tests simultaneously.

During the setting or hardening of a building material, such as plaster, an exothermic reaction occurs, which reaction is related to the hardening process taking place in the mixture. Therefore, the hardening or setting characteristics of the mixture can be determined by observing the temperature changes within the mixture. Accordingly, it is an object of the invention to provide apparatus for measuring the temperature changes occurring in samples and for recording such temperatures as a function of time. A further object of the invention is to provide an apparatus of this type having a frame or base for receiving a plurality of samples, temperature sensitive elements for positioning adjacent each of the samples, and associated equipment for recording the temperature history of each of the samples. The same objects apply to mixtures in which an endothermic reaction takes place.

It is another object of the invention to provide a control circuit for use with a plurality of temperature sensitive elements to permit recording of the heat history of a large number of samples concurrently on a single recorder. Another object of the invention is to provide such a circuit with controls for varying the relative positions of the various traces on the recording, controls for shifting all of the traces simultaneously, and controls for expanding and compressing the spacing of the family of traces. A further object of the invention is to provide such a circuit wherein the time at which each sample is placed in position is automatically registered.

It is another object of the invention to provide an apparatus for supporting a plurality of samples which apparatus includes pins or posts carrying the temperature sensitive elements for contacting the sample containers, the pins being spring loaded for firm contact with the containers. A further object of the invention is to provide such an apparatus in which the pins or posts are moved a finite distance by engagement with the sample containers to actuate switches in the control circuitry for feeding proper signals to the recording equipment.

The invention also comprises novel details of construction and novel combinations and arrangements of parts, which will more fully appear in the course of the following description. The drawings merely show and the description merely describes a preferred embodiment of the present invention which is given by way of illustration or example.

Figure 1:
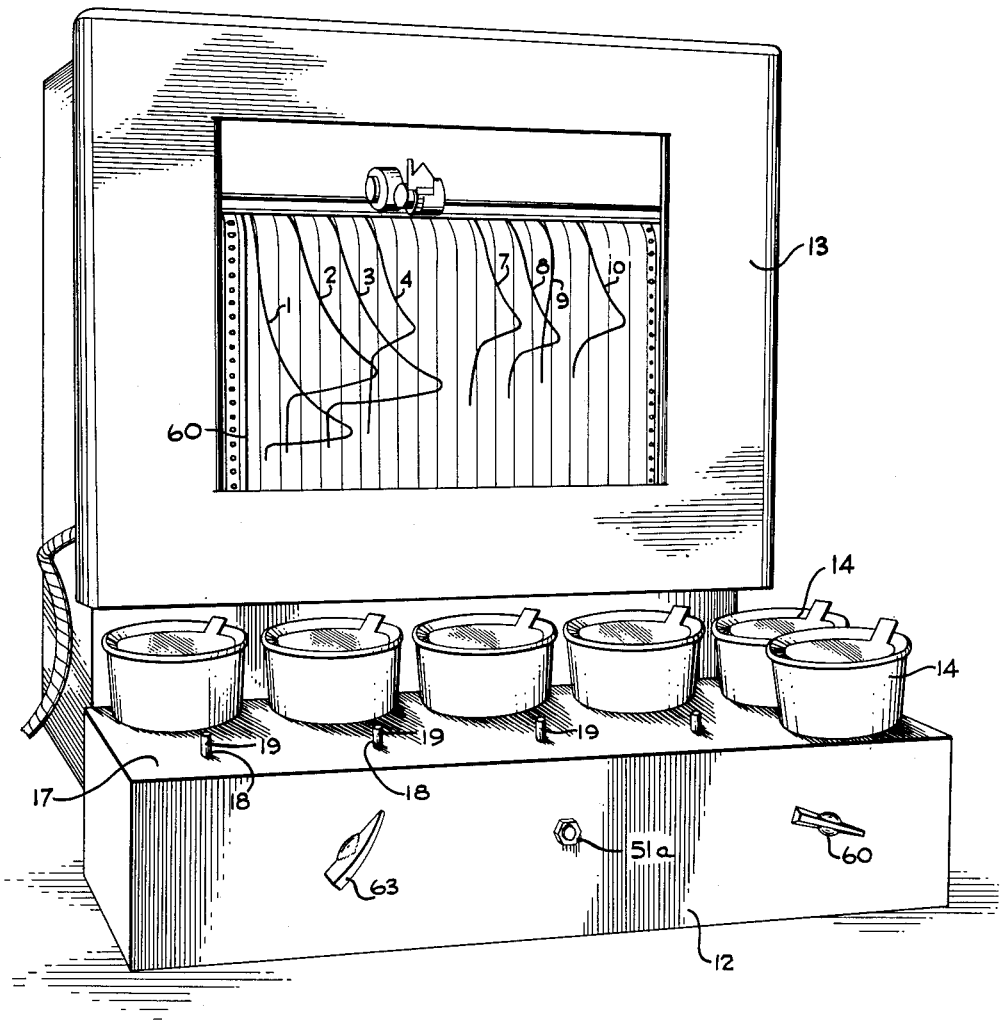
Fig. 1 is a perspective view of a preferred form of the invention showing a plurality of sample containers resting thereon.

In the apparatus of Fig. 1, a housing or sample support 12 is joined to a recorder 13. The housing 12 serves as a support for sample containers 14 which are shown in Fig. 1 as a plurality of conventional paper cups with lids. The apparatus described in this specification is adapted to handle ten samples concurrently and, therefore, the recorder 13 should be a ten-channel recorder, which may be conventional in design. The recorder will then have ten pairs of input terminals which may be connected to ten separate marking elements or which may be sequentially connected to a single marking element which is appropriately positioned on the chart paper to provide ten separate traces, the latter type of instrument being illustrated in Fig. 1.

Figure 2:
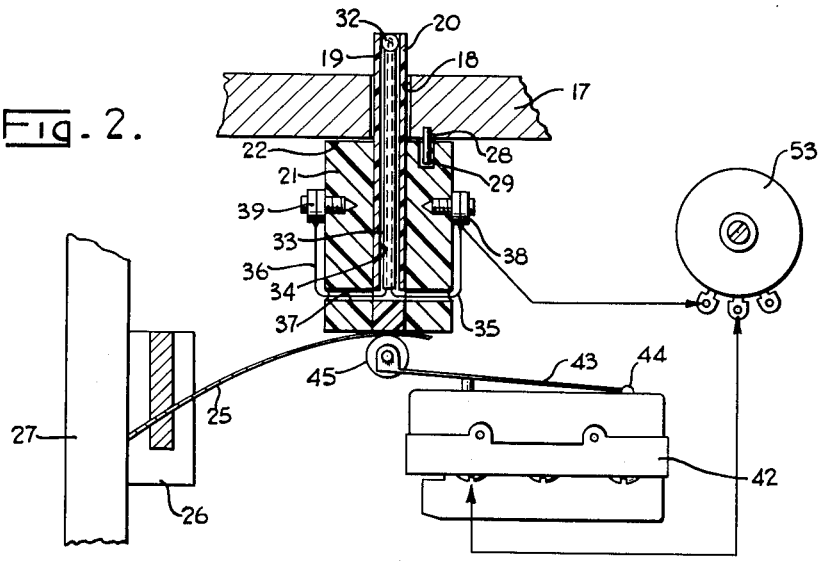
Fig. 2 is a view partly in section showing a portion of the interior of the apparatus of Fig. 1.

The housing 12 has a top surface or plate 17 with a plurality of spaced openings 18 therethrough, and a pin or post 19 projecting upward from the top surface through each of the openings. In the embodiment of the invention shown in Fig. 2, the post 19 is formed of two pieces, an inner member 20 which is a sliding fit in the opening 18 and an outer member 21 which is fixed to the inner member by suitable means such as cement, the outer member providing a shoulder 22 which limits motion of the pin relative to the housing in one direction. Of course, the post 19 may be machined or cast as a single piece if desired. A spring is provided for urging the shoulder 22 into engagement with the plate 17, this spring preferably being a leaf spring 25 having one end fixed in a bracket 26 carried on a side wall 27 of the housing 12 with the other end of the spring engaging the lower end of the post 19 urging the post in an upward direction. A guide pin 28 may be fixed in the plate 17 for engaging a corresponding opening 29 in the member 21 to limit the post 19 to axial movement in the opening 18.

A temperature sensitive element is mounted within the upper end of the post 19 for contacting a sample container which is placed over the post on the top surface of the housing. It is preferred in the practice of the invention to use a glass coated bead thermistor 32 as the temperature sensitive element, although other temperature sensitive elements such as thermocouples and conventional resistors may be used if desired. The thermistor 32 is mounted at one end of a glass tube 33 which in turn is positioned in a passage 34 in the inner member 20 of the post 19. Leads 35, 36 from the thermistor pass through the glass tube 33 and out opposite ends of a transverse opening 37 which communicates with the opening 34. Electrical terminals 38, 39 are carried on the post 19 for terminating the thermistor leads 35, 36, respectively, the terminals being insulated from each other preferably by making the post of an electrical insulating material. Of course, the posts and the top surface 17 should be made of materials having low heat transfer characteristics.

When a sample container is placed on the housing in contact with a post, the post is moved downward against the urging of the spring. This downward motion of the post is utilized to actuate a switch 42 which is mounted in the housing adjacent the post. A switch actuating arm 43 is pivoted to the switch at one end 44 and carries a roller 45 at the other end for engaging the moving post. In the preferred form of the invention shown herein, the switch 42 is spring loaded to urge the arm 43 in the upward direction and the roller 45 is positioned beneath the spring 25 so that both the switch arm and the spring urge the post upward. Downward motion of the post results in actuation of the switch by the switch arm. Thus it is seen that placing the sample container on the housing both brings the temperature sensitive element into firm contact with the container and actuates a switching circuit for purposes to be described below.

Figure 3:
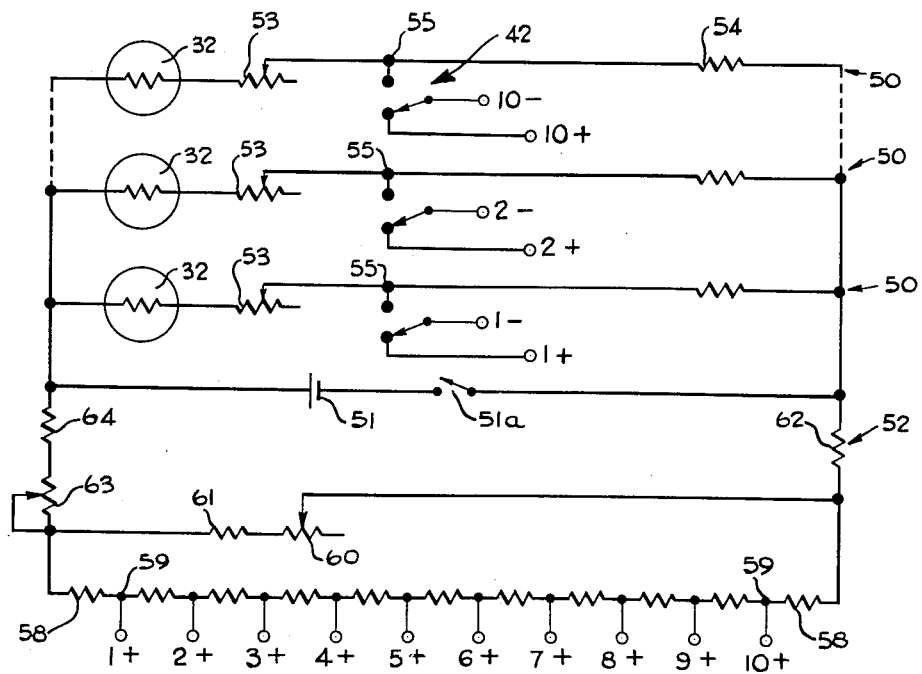
Fig. 3 is a schematic diagram of the electrical circuit of the invention.

A preferred form of electrical circuit for use with the apparatus of the invention is shown in Fig. 3. A plurality of signal circuits 50 corresponding in number to the quantity of temperature sensitive element carrying posts, are connected in parallel with a power source 51 and a divider circuit 52. A conventional off-on switch 51a may be connected in series with the power source 51. Each signal circuit includes a thermistor or other temperature sensitive element 32, a variable resistance 53 and another resistance 54 connected in series, and an output terminal 55 intermediate the ends of the circuit. The switch 42 is of the single pole, double throw type with the output terminal 55 connected to one fixed contact. The other fixed contact of the switch is connected to one terminal, say the plus terminal, of a pair of input terminals of the recorder and the moving contact of the switch is connected to the other terminal of the pair. The switch is internally biased to normally close the circuit between the moving contact and the other fixed contact and connect the pair of input terminals together. For the ten-unit apparatus described herein, the pairs of input terminals are identified by the numbers 1 through 10 followed by appropriate plus and minus symbols. Of course, the polarities of the circuit can be reversed if desired.

The divider circuit 52 includes eleven resistors 58 connected in series to provide a voltage dividing resistance having ten divider terminals 59 with a divider terminal connected to a corresponding input terminal of the recorder as indicated by the numerals 1 plus through 10 plus. A variable resistance 60 and a fixed resistance 61 are connected in series across the voltage dividing resistance to provide a parallel circuit which in turn is connected in series with a fixed resistance 62, a variable resistance 63 and a fixed resistance 64 to form the complete dividing unit 52.

The resistors 58 in the voltage dividing resistance are preferably equal in value and each of the variable resistances 53 is adjusted so that the over-all resistance of the variable resistance 53 and the associated thermistor 32 will be the same for each of the signal circuits, thereby providing equal spacing between the zeros for each trace on the recorder. Different spacings between particular traces can be achieved by changing the values of the resistors in the voltage dividing resistance or by varying the setting of the variable resistance 53. Where the trace spacing is not important or where the resistances of the thermistors are matched, the variable resistances 53 may be omitted.

The resistances 54 are preferably of high value relative to the thermistors 32 and serve to isolate the signal circuits from each other. Of course, in each of the signal circuits the fixed resistance 54 could be eliminated with the output terminal 55 positioned between the temperature sensitive element 32 and the variable resistance 53 with the latter also serving the function of the fixed resistance. The resistance 62 serves the same function in the divider circuit 52 as do the resistances 54 in the signal circuits 50.

The variable resistance 63 may be adjusted to shift the zero position of all ten traces on the recorder the same amount, serving in effect as a centering control for the circuit. Of course, the fixed resistance 64 could be omitted with a corresponding loss in sensitivity of control in the variable resistance 63.

The variable resistance 60 permits expansion and compression of the ten traces, changing the spacing between zero positions of each adjacent pair of traces a like amount. Also, the fixed resistance 61 may be omitted, resulting in a similar reduction of sensitivity of control in the variable resistance 60.

When a post 19 is in the uppermost position with no sample in contact therewith, the moving contact of the switch 42 (Fig. 3) will engage the lower fixed contact, thus providing a closed circuit across the pair of input terminals to the recorder. When a sample container is placed on the instrument engaging the post 19 and moving it downward, the switch 42 will be actuated to bring the moving contact into engagement with the upper fixed contact connecting the minus terminal of the pair of the recorder to the respective output terminal 55.

A representative family of traces is shown on the chart in Fig. 1, the chart moving in the downward direction with trace movements to the right indicating increases in temperature. In the initial operation of the instrument, all of the posts 19 are depressed to connect the output terminals 55 to the corresponding input terminals of the recorder. Then each variable resistance 53 is adjusted to provide the desired equal spacing between traces. Ordinarily, it is not necessary to adjust these resistances again and they may be placed within the housing 12 or in a separate housing. In determining the setting characteristics of materials, samples of the materials are placed in containers and positioned on the top plate 17 with the bottom of the container engaging the post 19, moving the post to the downward position. Then the temperature changes occurring in the particular sample are sensed by the thermistor 32 contained in the post, resulting in a change in resistance of the thermistor and a corresponding change in voltage applied to the input terminals of the recorder. As shown by the curves on the chart, there is a marked increase in temperature during the setting period which is indicative of the over-all setting or hardening characteristic of the particular material. This type of test is of particular value where the batch of material is being applied in a location which is inaccessible for hardness testing. Samples from the batch will be tested on the instrument of the invention at the same time that the remainder of the batch is being applied, providing an immediate and continuous indication of its condition.

When there is no sample positioned at a particular post, the corresponding switch will be in its normally closed position with the pair of input terminals of the recorder shorted together. This condition produces a straight trace on the recorder, normally at one edge of the chart. Where more than one pair of terminals are shorted, the straight traces will coincide. When a sample is placed on a post and the switch is actuated, the input pair of terminals are connected into the test circuit and the trace moves out to the position determined by the adjustments of the preceding paragraph. This shift of trace location provides an exact indication of when the sample was placed on the instrument.

In the particular record which has just been completed on the recorder of Fig. 1, channels 1, 2, 3, 4, 7, 8, and 10 have had samples of various setting characteristics positioned thereon, the beginning of each trace indicating when the sample was placed in position. Channels 5 and 6 have had no samples mounted thereon, resulting in the straight trace 60 at the left edge of the chart. Channel 9 has had a material positioned thereon which shows very little temperature change during the hardening process.

Although an exemplary embodiment of the invention has been disclosed and discussed, it will be understood that other applications of the invention are possible and that the embodiment disclosed may be subjected to various changes, modifications and substitutions without necessarily departing from the spirit of the invention.

I claim as my invention:

1. In an apparatus for operation in conjunction with a multi-channel recorder for determining temperature change characteristics of plasters, cements and the like, the combination of: support means for supporting a plurality of samples; a plurality of temperature sensitive elements carried in said support means for positioning adjacent each of the samples, respectively, each of said elements providing an electrical impedance change as a function of its temperature; a plurality of impedance elements, with an impedance element connected in series with each temperature sensitive element respectively at a junction point to form a plurality of series circuits; a voltage source; a voltage dividing resistance having a plurality of taps; and circuit means for connecting said series circuits and said voltage dividing resistance in parallel across said source, with said junction points and taps connected in pairs to provide a plurality of input signals to the recorder.

2. In an apparatus for operation in conjunction with a multi-channel recorder for determining temperature change characteristics of plasters, cements, and the like, the combination of: support means for supporting a plurality of samples; a plurality of temperature sensitive elements; a plurality of signal circuits, each of said signal circuits having an output tap and a temperature sensitive element carried in said support means for positioning adjacent a sample, each of said temperature sensitive elements providing an electrical impedance change as a function of its temperature; a voltage source; a voltage dividing resistance having a plurality of divider taps; circuit means for connecting said signal circuits and said voltage dividing resistance in parallel across said source; and circuit means for connecting pairs of said output and divider taps to the recorder for producing a plurality of recordings of the impedance changes of said temperature sensitive elements.

3. In an apparatus for operation in conjunction with a multi-channel recorder for determining temperature change characteristics of plasters, cements and the like, the combination of: support means for supporting a plurality of samples; a plurality of signal circuits, each of said signal circuits having an output tap, a variable resistance, and a temperature sensitive element carried in said support means for positioning adjacent a sample, each of said temperature sensitive elements providing an electrical impedance change as a function of its temperature; a voltage source; a voltage dividing circuit having a parallel circuit comprising a voltage dividing resistance with a plurality of divider taps and a variable resistance, with another variable resistance in series with said parallel circuit; circuit means for connecting said signal circuits and said voltage dividing circuit in parallel across said source; and circuit means for connecting pairs of said output and divider taps to the recorder for producing a plurality of recordings of the impedance changes of said elements.

4. In an apparatus for determining temperature change characteristics of plaster, cements and the like, the combination of: a frame for supporting a plurality of sample containers; a plurality of temperature sensitive elements; a plurality of posts projecting upward from said frame for contacting a sample container with each of said posts carrying a temperature sensitive element at the container contacting surface, each of said posts being movable relative to said frame from a first position out of contact with a container to a second position; and spring means carried on said frame for urging each of said posts to said first position, said posts being individually movable to said second position by placing a container on said frame in contact with the post.

5. In an apparatus for determining temperature change characteristics of plasters, cements and the like, the combination of: a frame for supporting a plurality of sample containers; a plurality of temperature sensitive elements; a plurality of posts carried in said frame, each of said posts having a container contacting surface with a temperature sensitive element mounted therein for contacting a container supported on said frame, each of said posts being movable relative to said frame from a first position to a second position; spring means carried on said frame for urging each of said posts to the first position, said posts being individually movable to said second position by contact with a container placed on said frame; and a plurality of electrical switches carried on said frame with a switch corresponding to each post, each of said switches having a switch arm for actuation thereof by movement of said switch arm from a first position to a second position, with each switch arm positioned for engagement by the corresponding post on moving from the first to the second position to move the switch arm from the first to the second position.

6. In an apparatus for determining temperature change characteristics of plasters, cements and the like, the combination of: a frame for supporting a plurality of sample containers; a plurality of temperature sensitive elements; a plurality of posts carried in said frame, each of said posts having a container contacting surface with a temperature sensitive element mounted therein for contacting a container supported on said frame, each of said posts being movable relative to said frame from a first position to a second position; spring means carried on said frame for urging each of said posts to the first position, said posts being individually movable to said second position by contact with a container placed on said frame; a plurality of electrical switches with a switch corresponding to each post, each of said switches having a switch arm for movement between first and second positions with a spring urging the arm to the first position; and means for mounting each of said switches on said frame with the arm of the switch engaging the corresponding post for urging the post to the first post position, with movement of the post to the second post position moving said switch arm to a second switch position.

7. In an apparatus for determining temperature change characteristics of plasters, cements and the like, the combination of: an apertured frame for receiving a sample container; a post slidingly positioned in said aperture with a container engaging portion extending from said aperture in one direction and a terminal carrying portion extending from said aperture in the opposite direction; a temperature sensitive resistance element carried in said container engaging portion of said post, said resistance element including a pair of leads passing through said post to said terminal carrying portion; a pair of electrical terminals carried on said terminal carrying portion, with a lead connected to each terminal respectively; a spring carried on said frame and engaging said post, said spring urging said post through said aperture in the one direction; and a switch having an actuator and mounted on said frame for engagement of said actuator by said terminal carrying portion of said post, with said post being moved in the opposite direction by a container placed on said frame to contact said container engaging portion and actuate said switch.

8. In an apparatus for determining temperature change characteristics of plastics, cements and the like, the combination of: an apertured frame for receiving a sample container; a post slidingly positioned in said aperture with a container engaging portion extending from said aperture in one direction and a terminal carrying portion extending from said aperture in the opposite direction; a temperature sensitive resistance element carried in said container engaging portion of said post, said resistance including a pair of leads passing through said post to said terminal carrying portion; a pair of electrical terminals carried on said terminal carrying portion, with a lead connected to each terminal respectively; a leaf spring carried on said frame and engaging said terminal carrying portion of said post and urging said post through said aperture in the one direction; a switch having an actuator with a roller, said switch urging said actuator in a first direction; and means for mounting said switch on said frame for engagement of said roller with said leaf spring adjacent said terminal carrying portion, with said switch oriented to aid said spring in urging said post in the one direction, with said post being moved in the opposite direction by a container placed on said frame to contact said container engaging portion and actuate said switch.

9. In an apparatus for operation in conjunction with a recorder having a plurality of pairs of input terminals for determining temperature change characteristics of plasters, cements and the like, the combination of: a plurality of temperature sensitive resistances; a plurality of signal circuits, each of said signal circuits including a temperature sensitive resistance and an isolating resistance serially connected, and an intermediate output terminal; a reference circuit including a voltage dividing resistance having a plurality of reference terminals, with a reference terminal corresponding to each of the output terminals; a power source; circuit means for connecting said signal circuits and said reference circuit in parallel across said power source; a plurality of single-pole, double-throw switches, each having first and second fixed contacts and a moving contact, with a switch corresponding to each of said signal circuits; means for connecting each of said output terminals to the first contact of the corresponding switch; means for connecting each of said reference terminals to the second contact of the corresponding switch and to an input terminal of a pair of the recorder; and means for connecting the moving contact of each of said switches to the corresponding other input terminal of each pair, whereby changes in resistance of said temperature sensitive resistances produce signals across the corresponding pairs of input terminals for recording at the recorder.

10. In an apparatus for operation in conjunction with a recorder having a plurality of pairs of input terminals for determining temperature change characteristics of plasters, cements and the like, the combination of: a plurality of temperature sensitive resistances; a plurality of signal circuits, each of said signal circuits including a temperature sensitive resistance, a variable zero adjusting resistance and an isolating resistance serially connected, and an intermediate output terminal; a reference circuit including a voltage dividing resistance having a plurality of reference terminals, with a reference terminal corresponding to each of the output terminals, a variable compressing resistance connected in parallel with said voltage dividing resistance, and a variable zero adjusting resistance connected in series with this parallel combination; a power source; circuit means for connecting said signal circuits and said reference circuit in parallel across said power source; a plurality of single-pole, double-throw switches, each having first and second fixed contacts and a moving contact, with a switch corresponding to each of said signal circuits; means for connecting each of said output terminals to the first contact of the corresponding switch; means for connecting each of said reference terminals to the second contact of the corresponding switch and to one input terminal of a pair of input terminals of the recorder; and means for connecting the moving contact of each of said switches to the corresponding other input terminal of each pair.

References Cited in the file of this patent

UNITED STATES PATENTS

| | | |
|---|---|---|
| 2,050,128 | Schlumberger | Aug. 4, 1936 |
| 2,364,923 | Smith | Dec. 12, 1944 |
| 2,541,121 | Sparklin | Feb. 13, 1951 |
| 2,602,132 | Young | July 1, 1952 |
| 2,649,715 | Goble | Aug. 25, 1953 |

OTHER REFERENCES

Publication, "The Chemistry and Testing of Cement," by Desch (1911), pages 150–153.